(12) United States Patent
Nicora

(10) Patent No.: US 9,440,134 B2
(45) Date of Patent: Sep. 13, 2016

(54) MICROSOFT KINECT

(75) Inventor: Daniel Antonio Nicora, Temecula, CA (US)

(73) Assignee: FULL-SWING GOLF, INC., San Diego, CA (US)

( * ) Notice: Subject to any disclaimer, the term of this patent is extended or adjusted under 35 U.S.C. 154(b) by 0 days.

(21) Appl. No.: 13/312,375

(22) Filed: Dec. 6, 2011

(65) Prior Publication Data

US 2012/0231894 A1    Sep. 13, 2012

Related U.S. Application Data

(60) Provisional application No. 61/420,154, filed on Dec. 6, 2010.

(51) Int. Cl.
| | |
|---|---|
| *A63B 69/36* | (2006.01) |
| *G09B 19/00* | (2006.01) |
| *A63B 22/02* | (2006.01) |
| *A63B 22/06* | (2006.01) |
| *A63B 24/00* | (2006.01) |

(52) U.S. Cl.
CPC ........... *A63B 69/36* (2013.01); *G09B 19/0038* (2013.01); *A63B 22/02* (2013.01); *A63B 22/0605* (2013.01); *A63B 22/0664* (2013.01); *A63B 24/0062* (2013.01); *A63B 2220/806* (2013.01); *A63B 2225/20* (2013.01); *A63B 2225/50* (2013.01)

(58) Field of Classification Search
CPC .. G09B 19/00; G09B 19/0038; A63B 69/00; A63B 69/36
USPC ........................ 434/247, 252; 463/3; 473/156
See application file for complete search history.

(56) References Cited

U.S. PATENT DOCUMENTS

| | | | | |
|---|---|---|---|---|
| 5,221,082 | A | * | 6/1993 | Curshod ...................... 473/199 |
| 5,320,362 | A | * | 6/1994 | Bear et al. ........................ 463/5 |
| 5,333,874 | A | | 8/1994 | Arnold et al. |
| 5,577,981 | A | * | 11/1996 | Jarvik ................................ 482/4 |
| 5,697,791 | A | * | 12/1997 | Nashner et al. .............. 434/247 |
| 5,846,139 | A | * | 12/1998 | Bair et al. ..................... 473/156 |
| 2003/0091966 | A1 | * | 5/2003 | Collodi .......................... 434/247 |
| 2003/0103016 | A1 | * | 6/2003 | Walker et al. ..................... 345/7 |
| 2006/0057549 | A1 | * | 3/2006 | Prinzel et al. ................ 434/247 |
| 2006/0205566 | A1 | * | 9/2006 | Watterson et al. ............... 482/8 |
| 2009/0191929 | A1 | | 7/2009 | Nicora |
| 2010/0265171 | A1 | * | 10/2010 | Pelah ............................ 345/157 |

\* cited by examiner

*Primary Examiner* — Robert J Utama
*Assistant Examiner* — Jerry-Daryl Fletcher
(74) *Attorney, Agent, or Firm* — Procopio, Cory, Hargreaves & Savitch LLP; Noel C. Gillespie

(57) ABSTRACT

Described herein are methods and apparatuses for simulating golf. For example, described herein is a system for simulating a golf game. The system includes a simulator with a golf ball launch area and a display and an exercise device. The exercise device and simulator are connected to a computer.

25 Claims, 2 Drawing Sheets

MICROSOFT KINECT

BACKGROUND

1. Field of the Invention

The present invention relates generally to computer based sports simulators, and more particularly to golf simulators. In particular, the invention relates to a golf simulator designed to simulate speed golf.

2. Description of the Related Art

Golf is a sport that is continuing to grow in popularity. One of golf's main attractions to enthusiasts is the continual challenge to improving one's game. To become an adept golfer and to maintain golfing proficiency, a significant amount of practice is required. However, few enthusiasts have the available time required to play full rounds of golf or to practice hitting golf balls at outdoor driving ranges. To solve this problem, many have found indoor golf simulators to be a viable alternative.

Golf simulators have been introduced for providing an indoor facility in which a golfer can practice all aspects of the golfing game. Examples of such devices are disclosed in U.S. Pat. No. 5,333,874 to Arnold et al., which is incorporated herein by reference.

SUMMARY

The system, methods, and devices of the invention each have several aspects, no single one of which is solely responsible for its desirable attributes. Without limiting the scope of this invention, its more prominent features will now be discussed briefly. After considering this discussion, and particularly after reading the section entitled "Detailed Description of the Preferred Embodiments" one will understand how the features of this invention provide advantages over other golf simulators.

One aspect of the invention is simulating speed golf. Another aspect of the invention is combining traditional golf simulators with exercise. In one embodiment, a golf simulator is connected to an exercise device allowing a golfer to both simulate golf shots and moving to the next hole.

In one embodiment, a system for simulating a golf game comprises a simulator containing a launch area and a display, an exercise device, and a computer, wherein the exercise device and simulator are connected to the computer. In another embodiment, a method of simulating a golf game comprises accelerating a golf ball towards a display at least once and exercising on an exercise device. In another embodiment, a method for conducting a virtual golf tournament comprises receiving first data from a first physical golf simulator connected to an exercise device, receiving second data from a second physical golf simulator connected to an exercise device, calculating, based at least in part on the first data and the second data, information related to golf performance and/or relative ranking of a golf participant, wherein the information includes the time spent using the simulator and exercise device, and making the information available to remote users via a computer network.

Other aspects and advantages of the present invention will become apparent from the following detailed description, which, when taken in conjunction with the accompanying drawings, illustrates by way of example the principles of the invention.

DETAILED DESCRIPTION OF THE PREFERRED EMBODIMENTS

The following detailed description is directed to certain specific embodiments. However, the invention can be embodied in a multitude of different ways. Reference in this specification to "one embodiment" or "an embodiment" means that a particular feature, structure, or characteristic described in connection with the embodiment is included in at least one embodiment. The appearances of the phrase "in one embodiment," "according to one embodiment," or "in some embodiments" in various places in the specification are not necessarily all referring to the same embodiment, nor are separate or alternative embodiments mutually exclusive of other embodiments. Moreover, various features are described which may be exhibited by some embodiments and not by others. Similarly, one or more features may be described for one embodiment which can also be reasonably used in another embodiment.

Golf simulators are typically adapted for traditional rounds of golf. They only provide minimal exercise, even less than an actual game of golf because a player does not walk to the next hole. There is a desire for a simulator that provides both more game style options and useful health benefits.

Speed golf, also known as "extreme golf", "fitness golf", and "hit and run golf", is becoming an increasingly popular version of golf. A player's score may be calculated by adding the minutes to complete the game to the number of strokes. The golfer with the lowest score wins the tournament. Thus, players typically run to the next hole in order to save time. Speed golfing allows players to finish a round of golf more quickly and gain important fitness benefits.

The ability to play speed golf using a simulator provides several important advantages. It allows a speed golfer to avoid the inconvenience of playing at non-peak times, thus allowing an interested athlete to participate in the sport more often. A speed golf simulator prevents distractions. A player does not need to worry about other golfers being on the path to the next hole or waiting for another golfer to complete a hole. A speed golf simulator also provides a fitness routine for those who enjoy a traditional round of golf, but would like to be more physically challenged. Runners may use a speed golf simulator as a more entertaining method of training. Networked speed golf simulators allow players to participate in tournaments even in areas without a large population of people interested in speed golf. Speed golf simulators provide an entertaining way to get into better shape and improve a player's golf swing.

Figure 1:
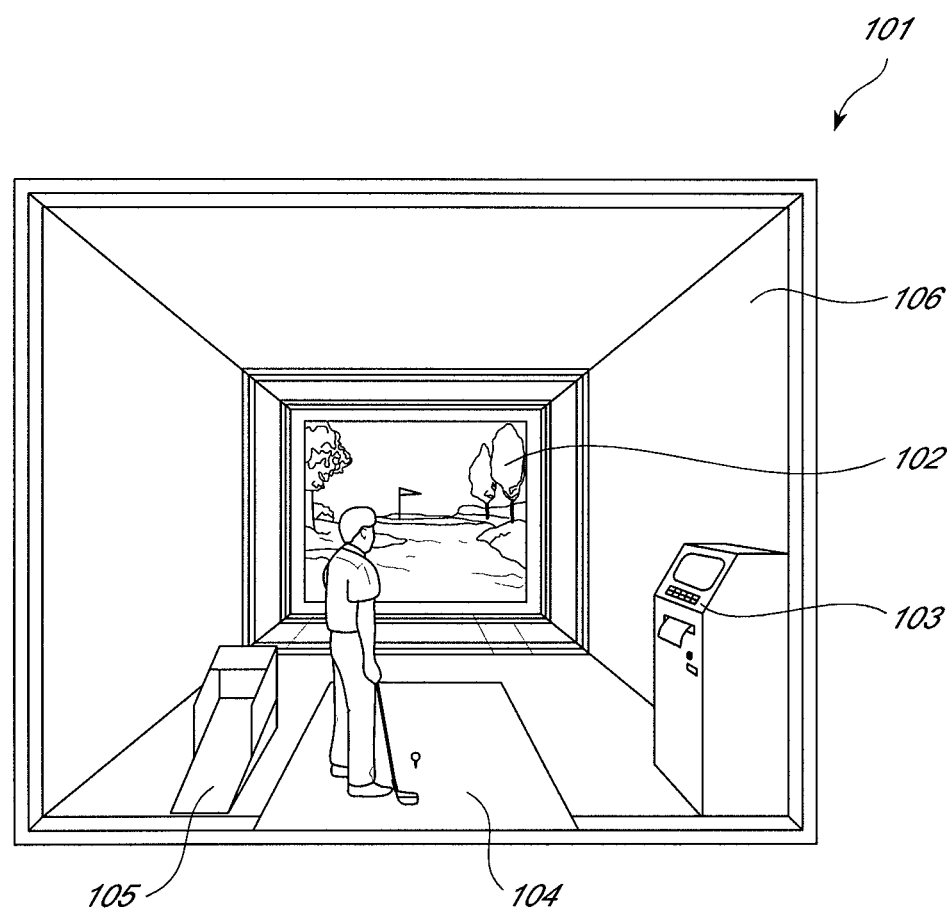
FIG. 1 shows a speed golf simulator.

Referring to FIG. 1, a golf simulator 101 is shown. The golf simulator may contain a housing 106, a display 102, a launch area 104, and a computer 103. The golf simulator may be any number of designs, including the designs described in U.S. Pat. No. 5,333,874 to Arnold et al. In one embodiment, an image of a golf course is projected onto display 102. A player swings at the golf ball in the launch area 104, accelerating the ball towards the display 102. Sensors determine information about the movement of the ball and transmit that information to computer 103. Many methods can be used to determine the movement of the ball, including those described in U.S. Pat. No. 5,333,874 to Arnold et al. In some embodiments, there is no housing 106.

Unlike traditional golf simulators, an exercise device 105 is electrically connected to computer 103. Computer 103 may contain any suitable processor. In some embodiments more than one computer may be used to perform the required functions. In one embodiment the exercise device contains at least some processing and communication circuitry. In one embodiment, the exercise device computer may be networked to the computer 103. In one embodiment the network may be a Wide Area Network ("WAN"), a Local Area Network ("LAN"), or a Personal Area Network ("PAN"). In another embodiment, the exercise device computer may wirelessly communicate with computer 103. The wireless network may be a WLAN ("Wireless Local Area Network") or a WPAN ("Wireless Personal Area Network"). However, any suitable networking configuration may be used. In another embodiment, the exercise device does not contain a separate computer, and the computer 103 controls the simulator as well as the exercise device. It will be apparent to one skilled in the art that any appropriate configuration can be used to connect the exercise device to computer 103.

In one embodiment the exercise device is a treadmill. In another embodiment, the exercise device is an exercise bicycle, an elliptical machine, or any other suitable exercise device. There may be more than one exercise device connected to the simulator. This allows a player to use a different type of exercise device in different games or alternate devices between holes. The exercise device 105 may be placed within a housing 106 (if provided) or outside of it.

In addition to the exercise devices described above, an exercise device may be a motion monitor that can detect player movements in or around the golf simulator. In this embodiment, the player can walk or run in place instead of on a treadmill or the like. This motion can be monitored by the motion monitor to determine a time, effective travel distance, or other parameter of player motion. This monitoring of player motion can be processed and used by the simulator in the same way as data from a treadmill, for example. Suitable motion monitors and associated technology are known, with the MICROSOFT KINECT™ device being one such example. Generally, these devices use processing of visible or IR illumination of the subjects to detect and characterize position and movement of objects or people in their field of view. If this type of device is used, it can also be used to provide commands to the simulator with hand motions or the like.

Figure 2:
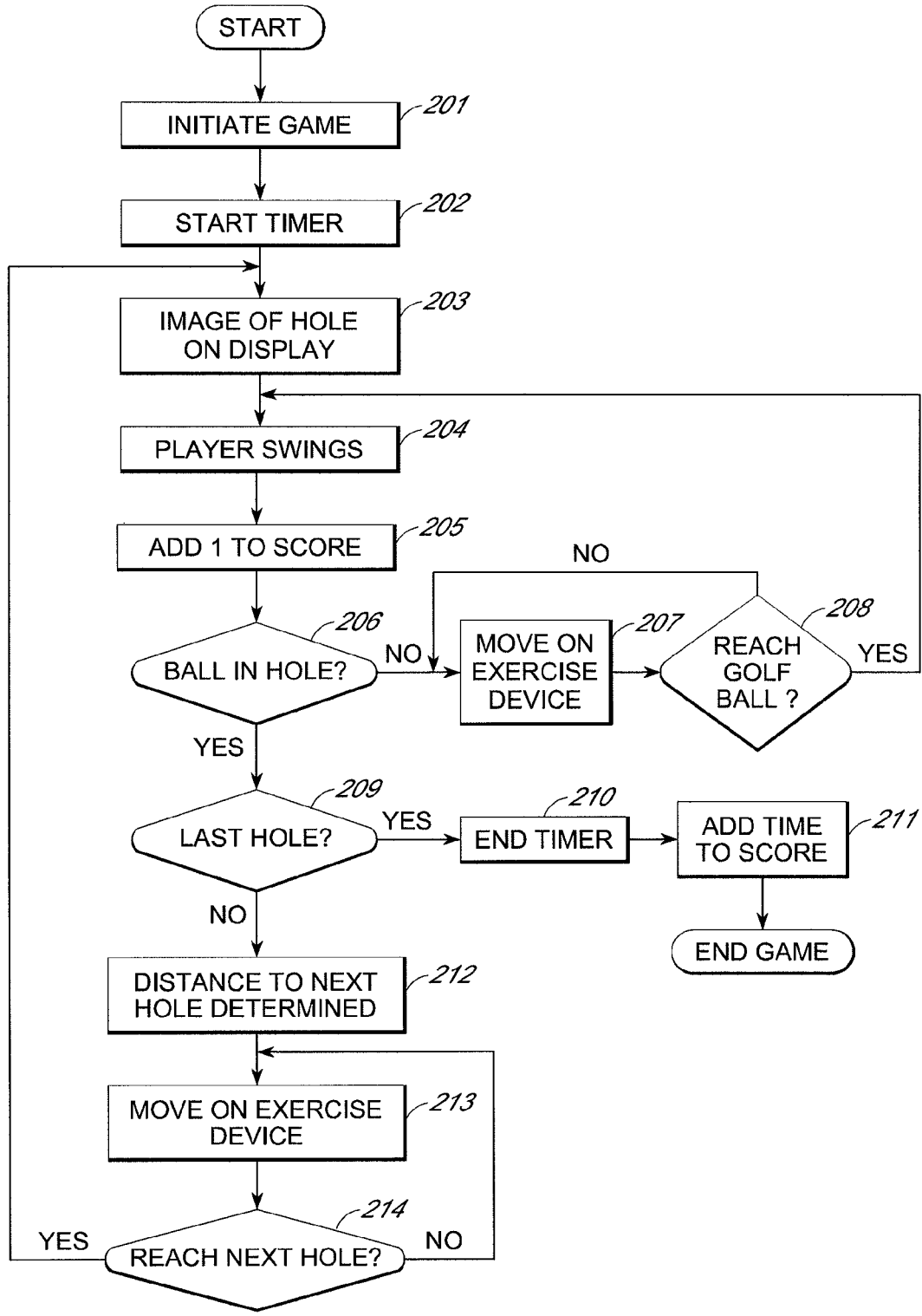
FIG. 2 shows a process for simulating speed golf using a speed golf simulator.

The speed golf simulator may be used with many variations in the game rules, game playing process, and scoring. FIG. 2 shows one example of simulating a round of speed golf using a speed golf simulator. A player simulates hitting the golf ball and moving to the next hole. The score may be calculated by adding the time to complete the round to the number of strokes. First, a player initiates a game 201. In one embodiment, initiating a game 201 involves selecting a difficulty level that is related to the distance between the holes and the slope of the terrain. A timer 202 is started at the beginning of the game. An image of the current hole is shown on the display 203. The player hits the golf ball 204, and 1 point is added to the player's score 205.

If the player did not hit the golf ball into the virtual hole 206, the player may move on the exercise device 207 the distance to where the ball landed. A player may choose to carry one or more golf clubs while moving on the exercise device to more realistically simulate speed golf. In one embodiment, if the distance is under a certain amount, such as when putting, the player will not be required to move on the exercise device.

The computer calculates the distance to the golf ball. In one embodiment the exercise device stops or otherwise visually or audibly signals to the player that the distance has been achieved. In another embodiment, the exercise device transmits information about the distance moved to the computer, and the computer gives some indication that the player has achieved the required distance. The computer may display the distance required or whether the required distance has been achieved on display 102. The required or achieved distance could instead be displayed on the computer 103 screen, a screen on the exercise device, or any other display medium. In one embodiment, an audible indicator lets the player know the required distance or whether the required distance has been achieved.

In one embodiment, a player can see the golf course change on display 102 according to the player's movement on the exercise device. In one embodiment, the display view goes up and down as the player goes over hills. The image on the display 102 is updated according to the player's distance and speed on the exercise device.

Once the player has reached the ball 208, the player swings again 204, and that portion of the process is repeated. Otherwise, if the player did hit the golf ball into the virtual hole 206, the computer 103 checks to see if it is the last hole 209. If so, the game ends, and the final score is calculated. The timer is ended 210, and the number of minutes taken to complete the round is added to the score 211.

If the player has not completed all of the holes in the round, computer 103 calculates the distance to the next hole 212. The player moves on the exercise device 213 until the player has gone the specified distance. This process is similar to 207. Once the player has reached the next hole 214, the process continues until all holes have been played.

In one embodiment a speed golf simulator is connected to a network to allow players to participate in tournaments as described in U.S. application Ser. No. 61/062,208, incorporated by reference in its entirety. As suggested in the U.S. application Ser. No. 61/062,208, players in different geographic locations may play against one another in a tournament. This allows speed golf enthusiasts to more easily find other competitors. In one embodiment, a player's score in the tournament is at least in part affected by the amount of time required to move the distance between each hole on the exercise device. A player's score may be calculated by adding the number of strokes to the amount of time required to complete the round. In one embodiment, a speed golf simulator allows a player to choose from a list of tournament styles, including a tandem variation where two players on the same team alternate playing a hole and a best ball variation where players on the same team hit from the location of the team's best ball.

Various modifications to these examples may be readily apparent to those skilled in the art, and the principles defined herein may be applied to other examples without departing from the spirit or scope of the novel aspects described herein. Thus, the scope of the disclosure is not intended to be limited to the examples shown herein but is to be accorded the widest scope consistent with the principles and novel features disclosed herein. Accordingly, the novel aspects described herein is to be defined solely by the scope of the following claims.

What is claimed is:

1. A system for simulating a golf game, comprising:
   a simulator containing a golf ball launch area and a display, wherein the golf ball launch area is configured for launching a golf ball toward the display when a user is positioned on top of the golf ball launch area;
   a computer coupled to the simulator, wherein the computer is configured to compute a distance to a golf ball for the user after the user launches the golf ball toward the display from the golf ball launch area, wherein the distance is computed based on where the golf ball has landed; and
   an exercise device coupled to the computer and positioned in the vicinity of, while separated from the golf ball launch area, wherein the exercise device is configured to track a user exercise activity when the user is positioned on top of the exercise device, wherein the exercise activity includes that the user moves based on the computed distance to simulate moving toward the golf ball after the launched golf ball has landed.

2. The system according to claim 1, wherein the simulator comprises sensors configured to detect golf ball motion.

3. The system according to claim 1, wherein the computer is configured to generate a display of a golf ball trajectory in response to detected golf ball motion.

4. The system according to claim 1, wherein the simulator displays an image of a golf course which changes according to a player movement during the exercise activity.

5. The system according to claim 1, wherein the exercise device includes a treadmill.

6. The system according to claim 1, wherein the exercise device includes a motion monitor.

7. The system according to claim 1, wherein the computer is connected to a network.

8. The system according to claim 1, wherein the computer calculates a score based in part on the amount of time spent by the user using the simulator and the exercise device.

9. The system according to claim 1, wherein the computer indicates a hill gradient for the distance.

10. The system according to claim 1, wherein the computer calculates a distance to travel on the exercise device.

11. The system according to claim 10, wherein the distance is based at least in part on a selected difficulty level.

12. The system of claim 1, wherein the computer is further configured to calculate a distance to a next virtual hole for the user to travel using the exercise device if the launched golf ball does enter the virtual hole.

13. The system of claim 1, wherein the simulator is configured to show the golf course change on the display as the user uses the exercise device.

14. The system of claim 1, wherein the simulator comprises the computer.

15. The system of claim 1, wherein the exercise device comprises the computer.

16. The system of claim 1, wherein the exercise device includes an exercise bicycle.

17. The system of claim 1, wherein the exercise device includes an elliptical machine.

18. A method of simulating a golf game, comprising:
    detecting a golf ball motion as the golf ball travels toward a display after a user positioned on top of a golf ball launch area launches the golf ball toward the display;
    determining whether the launched golf ball enters a virtual hole;
    if not, computing a distance for the user to move to reach the golf ball from the golf ball launch area, wherein the distance is computed based on where the golf ball has landed;
    tracking a user exercise activity when the user positioned on top of an exercise device moves based on the computed distance, wherein the user exercise activity simulates the user moving from the golf ball launch area to where the launched golf ball has landed, wherein the exercise device is located in the vicinity of, while separated from the golf ball launch area.

19. The method of claim 18, further comprising updating a display of a golf ball trajectory on the display in response to the detected golf ball motion.

20. The method of claim 18, further comprising updating a display of an image of a golf course in response to the tracked exercise activity.

21. The method of claim 18, further comprising scoring the golf game by calculating the number of times the ball is launched towards the display and adding it to the amount of time spent on the game.

22. The method of claim 18, further comprising calculating a distance to a next virtual hole for the user to move using the exercise device if the launched golf ball does enter the virtual hole.

23. The method of claim 18, further comprising changing a golf course image on the display in response to detecting user exercise activity.

24. The method of claim 18, wherein the exercise device includes an exercise bicycle.

25. The method of claim 18, wherein the exercise device includes an elliptical machine.

* * * * *

UNITED STATES PATENT AND TRADEMARK OFFICE
CERTIFICATE OF CORRECTION

PATENT NO.         : 9,440,134 B2                                          Page 1 of 1
APPLICATION NO.    : 13/312375
DATED              : September 13, 2016
INVENTOR(S)        : Daniel Antonio Nicora It is certified that error appears in the above-identified patent and that said Letters Patent is hereby corrected as shown below:

On the Title Page

Item (54), and in the Specification, Column 1, Line 1:
Change "MICROSOFT KINECT"

To:
--METHOD AND APPARATUS FOR SIMULATED GOLF--

Signed and Sealed this
Third Day of January, 2017

Michelle K. Lee
*Director of the United States Patent and Trademark Office*